United States Patent [19]
Sawinski

[11] Patent Number: 5,677,664
[45] Date of Patent: Oct. 14, 1997

[54] CONTROLLING AUTOMOBILE ALARM SYSTEMS

[75] Inventor: James Sawinski, Bridgeport, Ohio

[73] Assignee: Jon Snyder, Inc., Wintersville, Ohio

[21] Appl. No.: 540,489

[22] Filed: Oct. 10, 1995

[51] Int. Cl.$^6$ ..................................................... B60R 25/04
[52] U.S. Cl. .................... 340/426; 340/430; 340/825.69; 340/425.5; 340/528; 307/10.2
[58] Field of Search .......................... 340/426, 430, 340/825.69, 429, 428, 425.5, 527, 528, 309.15; 307/10.2, 10.4, 10.5

[56] References Cited

U.S. PATENT DOCUMENTS

| | | | |
|---|---|---|---|
| 4,638,293 | 1/1987 | Min | 340/426 |
| 4,754,255 | 6/1988 | Sanders et al. | 340/539 |
| 4,980,666 | 12/1990 | Hwang | 340/426 |
| 5,049,867 | 9/1991 | Stouffer | 340/426 |
| 5,146,215 | 9/1992 | Drori | 340/825.32 |
| 5,285,186 | 2/1994 | Chen | 340/428 |
| 5,307,048 | 4/1994 | Sonders | 340/426 |
| 5,334,969 | 8/1994 | Abe et al. | 340/429 |
| 5,334,974 | 8/1994 | Simms et al. | 340/990 |
| 5,467,070 | 11/1995 | Drori et al. | 340/426 |

OTHER PUBLICATIONS

Chuck Randazo, "To Valet or not to Valet?" Mobile Electronics Specialist, Jul., 1995.

Primary Examiner—Jeffery Hofsass
Assistant Examiner—Davetta Woods
Attorney, Agent, or Firm—Wood, Herron & Evans, L.L.P.

[57] ABSTRACT

A passive arming vehicle alarm system has a valet mode which is activated or deactivated by wireless remote control, thus avoiding the need for hiding a valet switch in the vehicle and subjecting the vehicle to attack at the valet switch. The wireless remote control is also used deactivate the alarm when the alarm is sounding, by depressing any of the buttons on the wireless remote control, regardless of the primary function of the button. As a result, the alarm may be quickly deactivated. The alarm also features progressive passive arming; the alarm emits a brief signal such as a siren chirp as a warning, prior to passively self-arming. As a result, the owner/operator will be warned that the vehicle is about to passively arm and may prevent passive arming (e.g., by opening a door) if it is undesired. Progressive passive arming begins whenever the alarm is disarmed, so that if the alarm is disarmed but the owner is subsequently distracted, the alarm will automatically re-arm and the vehicle will not be left unprotected.

19 Claims, 5 Drawing Sheets

CONTROLLING AUTOMOBILE ALARM SYSTEMS

FIELD OF THE INVENTION

The present invention relates to alarm systems for protecting vehicles.

BACKGROUND OF THE INVENTION

Due to the high incidence of theft, many vehicles now contain original-equipment or aftermarket alarm systems. Typically an alarm system includes sensors for detecting events such as opening of doors or hood, ignition of the vehicle, or physical motion of the vehicle. If these events occur while the alarm is armed, the alarm will sound. Typically the owner has a key, code, or radio transmitter which is used to disarm the alarm to prevent the alarm from sounding.

One difficulty with some vehicle alarm systems is that the owner must remember to arm the alarm before leaving the vehicle. To respond to this difficulty, so-called passive alarm systems have been developed, which automatically (passively) arm the alarm in response to the occurrence of a predetermined arming event, such as, for example, the car being turned off.

A difficulty with passive alarm systems is that, in certain circumstances, the owner desires to prevent the alarm from passively arming, for example when the vehicle is left with a valet parking service or is loaned to someone unfamiliar with the alarm system. To answer this need, alarm systems have been equipped with a so-called valet switch, typically a toggle switch hidden within the vehicle which, when flipped to the "valet" position, prevents the alarm from passively arming.

The valet switch, while solving one problem, creates another. Specifically, vehicle thieves often find the alarm system can be permanently disabled by simply locating and flipping the valet switch, leaving the car unprotected. There are only a few likely places where the valet switch can be hidden, and vehicle thieves have become adept at finding the "hidden" valet switch on a given vehicle in a very short period of time.

A second disadvantage with a passive alarm system is that the alarm system may passively arm at undesired times; for example, while the owner is fueling the vehicle at a gas station. Furthermore, even a passive alarm system may be unintentionally left unarmed, for example if the alarm is disarmed by the owner, but the owner is subsequently distracted and leaves the vehicle without manually rearming the alarm. Since passive alarms arm only upon a predetermined event such as the vehicle being turned off, in such a scenario the vehicle will remain unarmed and unprotected, potentially for a long period of time.

An additional problem with vehicle alarms generally is that the owner, from time to time, may forget to disarm the alarm before attempting to enter the vehicle, so that the alarm sounds. The resulting false alarm is not only initially frightening, but if the false alarm continues for any substantial length of time, the result may be embarrassment to the owner causing the owner to intentionally leave the vehicle disarmed in the future. Furthermore, lengthy or frequent false alarms may desensitize neighbors and passersby to the alarm, causing them to ignore an alarm during an actual theft.

SUMMARY OF THE INVENTION

The above difficulties are overcome by a vehicle alarm system in accordance with principles of the present invention.

Specifically, in accordance with one general aspect of the present invention, a vehicle alarm system includes a control circuit, an alarm signaller (e.g., a siren), an alarm condition detector (e.g., a shock detector) for detecting an alarm condition and causing the control circuit to signal an alarm if the alarm system is armed, and a wireless remote control system which, when activated by the vehicle operator, transmits a signal to the alarm system to activate or deactivate a valet mode of the control circuit. Because the valet mode is enabled and disabled by wireless remote control, it is not necessary to hide a valet switch in the vehicle and subject the vehicle to attack by a thief who is capable of locating the valet switch.

The wireless remote control may also be used for other purposes, for example, to disable the alarm, activate a panic mode of the alarm (for example if the owner is being threatened when approaching their vehicle in a parking lot), lock or unlock the doors, etc.

Furthermore, the control circuit may be programmed to create a brief signal such as one or more siren chirps to indicate activation or deactivation of the valet mode of the alarm system. Similar signals may be used to indicate disarming of the alarm.

In accordance with a second general aspect of the present invention, an alarm system of the general type having a control circuit, and alarm signaller and an alarm condition detector, is programmed to emit a brief signal such as a siren chirp as a warning, prior to passively self-arming. The result is a progressive passive arming behavior which warns the owner when the alarm system is about to passively arm, and provides sufficient time (e.g., 30 seconds) after this warning before the alarm arms. If the owner notices this warning signal and does not desire the alarm to arm (e.g., at a gas station), the owner can then takes steps to prevent arming, e.g., by opening a door.

In accordance with a related general aspect of the invention, the control circuit is programmed to automatically begin the progressive passive re-arming process immediately after the alarm is disarmed. As a result, if the alarm is disarmed but the owner is subsequently distracted, the alarm will automatically re-arm and the vehicle will not be left unprotected.

Finally, in accordance with a third general aspect of the present invention, a wireless remote control for an alarm system of the general type discussed above, may be used to deactivate the alarm when the alarm is sounding, by depressing any of the buttons on the wireless remote control, regardless of the primary function of the depressed button. As a result, if the owner accidentally activates the alarm, the alarm may be quickly deactivated without undertaking an elaborate and time-consuming disabling procedure, reducing the likelihood for embarrassment of the owner, or desensitization of neighbors and passersby.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
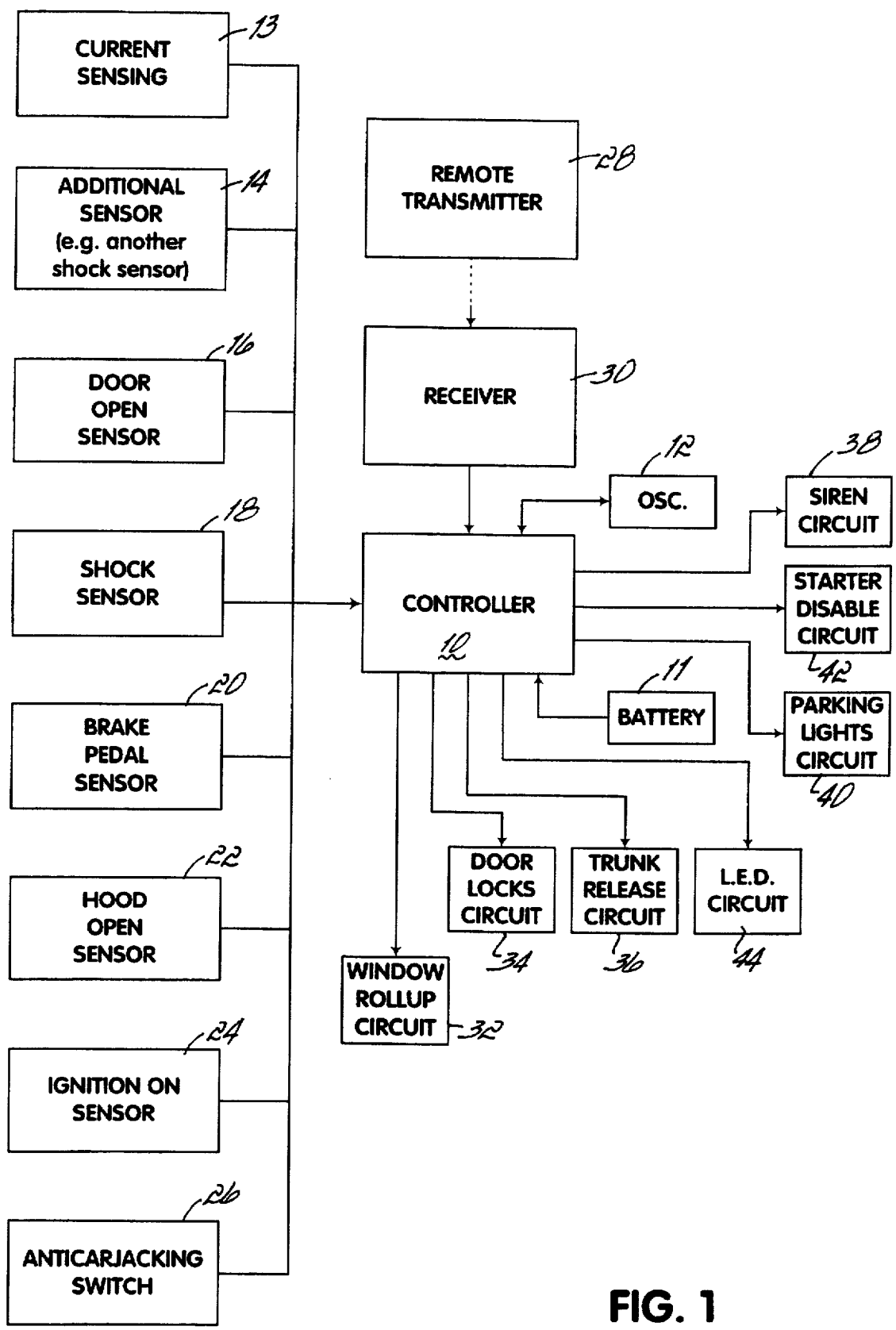
FIG. 1 is a block diagram of an alarm system in accordance with principles of the present invention.

Referring to FIG. 1, a vehicle alarm system in accordance with principles of the present invention includes a central controller 10, powered by the vehicle battery 11, which receives inputs from a plurality of vehicle condition sensors and controls a plurality of circuits in the vehicle to accomplish the features of the present invention. Controller 10 is typically a digital microprocessor programmed to control operations of the alarm system, and executing these instructions in synchrony with a clock signal from oscillator 12. Controller 10 may be any suitable commercially available microprocessor having sufficient input and output lines to receive the input signals discussed below and produce control signals suitable for controlling the operations discussed below. One particularly suitable microprocessor is the family of microcontrollers sold by Microchip Technology Inc. of 2355 W. Chandler Blvd., Chandler, Ariz. 85224-6199 under the part numbers PIC16xxx. These microcontrollers have a large number of input and output ports, are easily factory or user-programmable, and are relatively inexpensive.

As illustrated in FIG. 1, controller 10 receives input from current sensor 13 to determine whether there is ignition current indicating that the vehicle's motor is running. Current sensor 13 may be a Hall effect sensor surrounding the vehicle ignition wire or a sense resistor in series with the low-voltage side of the vehicle ignition circuit.

Controller 10 receives input from door open sensor 16 to determine if any one of the vehicle doors is open. Sensor 16 can be advantageously connected to the overhead light circuit of the vehicle, which will have a high voltage only when a door of the vehicle is opened.

Controller 10 receives input from shock sensor 18 to determine if the vehicle has been subjected to mechanical shock. Shock sensor 16 may be, for example, a shock sensor of the type disclosed in copending application Ser. No. 08/262,140, filed Jun. 20, 1994, to be issued as U.S. Pat. No. 5,459,447 on Oct. 17, 1995, which includes a piezoelectric strip and detection circuitry which produces a current path when a mechanical vibration is detected by the piezoelectric strip.

Controller 10 receives input from a brake pedal sensor 20 to determine if the vehicle brake pedal has been depressed. Sensor 20 is advantageously connected to the brake light circuit of the vehicle, which will have a high voltage only when the brake pedal is depressed.

Controller 10 receives input from a hood open sensor 22 to determine if the vehicle hood has been opened. Sensor 22 may be a switch mounted in the vehicle hood to detect whether the hood is open, or may be connected to a hood light circuit if the vehicle has a hood light.

Controller 10 receives input from an ignition on sensor 24 to determine if the vehicle button has been placed in the ignition position. Sensor 24 is advantageously connected to the ignition wire leading from the ignition switch, which will have a high voltage only when the ignition switch has been turned to the "run" position.

Finally, controller 10 receives input from an additional sensor 14, selected at the option of the alarm installer and the vehicle owner to provide additional protection to the vehicle; for example, an additional shock detector may be connected to controller 10.

The foregoing sensors 13–24 are used by controller 10 to detect the status of the vehicle and sound an alarm at an appropriate time. Specifically, in a regularly-repeated main loop of the program in controller 10, controller 10 detects the state of sensors 13–24 and an internal software flag indicative of whether the alarm system is armed. If the alarm system is armed, controller 10 will enter an alarm active subroutine (FIG. 4) to signal an alarm whenever ignition current is detected (sensor 13), a door is opened (sensor 16), a mechanical shock is detected (sensor 18), the brake pedal is pressed (sensor 20), the hood is opened (sensor 22), the ignition switch is turned on (sensor 24) or another sensed event occurs (sensor 14).

Controller 10 also receives input from an anticarjacking switch 26 mounted in the vehicle. Anticarjacking switch 26, when in the "on" position, causes controller 10 to signal an alarm whenever a door of the vehicle is opened and closed (as detected by sensor 16) while the vehicle is running, which activity is indicative of a carjacking. This anticarjacking feature can be defeated by the owner by flipping anticarjacking switch 26 to the "off" position.

Controller 10 receives commands from the vehicle owner through a wireless remote control transmitter 28. Transmitter 28 includes a plurality of buttons each of which causes transmitter 28 to produce a unique radio signal. These radio signals are received by receiver 30 and delivered to controller 10 to control functions of the alarm system as discussed below. Among the functions controlled from buttons on remote transmitter 28 are arming and disarming of the alarm system (FIG. 3C), enablement of an alarm valet mode (FIG. 2), termination of an alarm (FIG. 3C), initiation of a panic alarm (FIG. 2), and activation of the vehicle's window, door lock, and trunk release systems.

To provide these functions, controller 10 is connected to the vehicle's window rollup circuit 32 (if any) to enable controller 10 to activate the window circuit to roll the vehicle's windows up or down. Further, controller 10 is connected to the vehicle's power door lock circuit 34 (if any) to lock or unlock the vehicle's doors. Similarly, controller 10 is connected to the vehicle's trunk release circuit 36 (if any) to allow controller 10 to open the vehicle's trunk.

When controller 10 detects an alarm condition, as noted above, it signals this alarm visually and audibly. For this purpose, controller 10 is connected to a siren circuit for producing an audible siren or other audible alarm signal such as a spoken alarm signal. Controller 10 is further connected to the vehicle's parking lights circuit 40 so that controller 10 may flash the vehicles parking lights to signal an alarm. Controller 10 is also connected to the vehicle's starter circuit 42, to prevent initiation of the vehicle's starter during an alarm. (The connection to starter circuit 42 may advantageously be a relay interrupting the electrical connection from the vehicle's ignition switch to the starter relay.)

Controller 10 signals the status of the alarm system to the vehicle owner through a light emitting diode (LED) 44 mounted inside the vehicle and visible through the windows. This diode may indicate, for example, whether the alarm system is armed, whether an alarm has been triggered, whether the anticarjacking mode is active, or any other modes or conditions of the alarm system. A single LED may signal multiple different modes or conditions by producing a coded blinking pattern.

Figure 2:
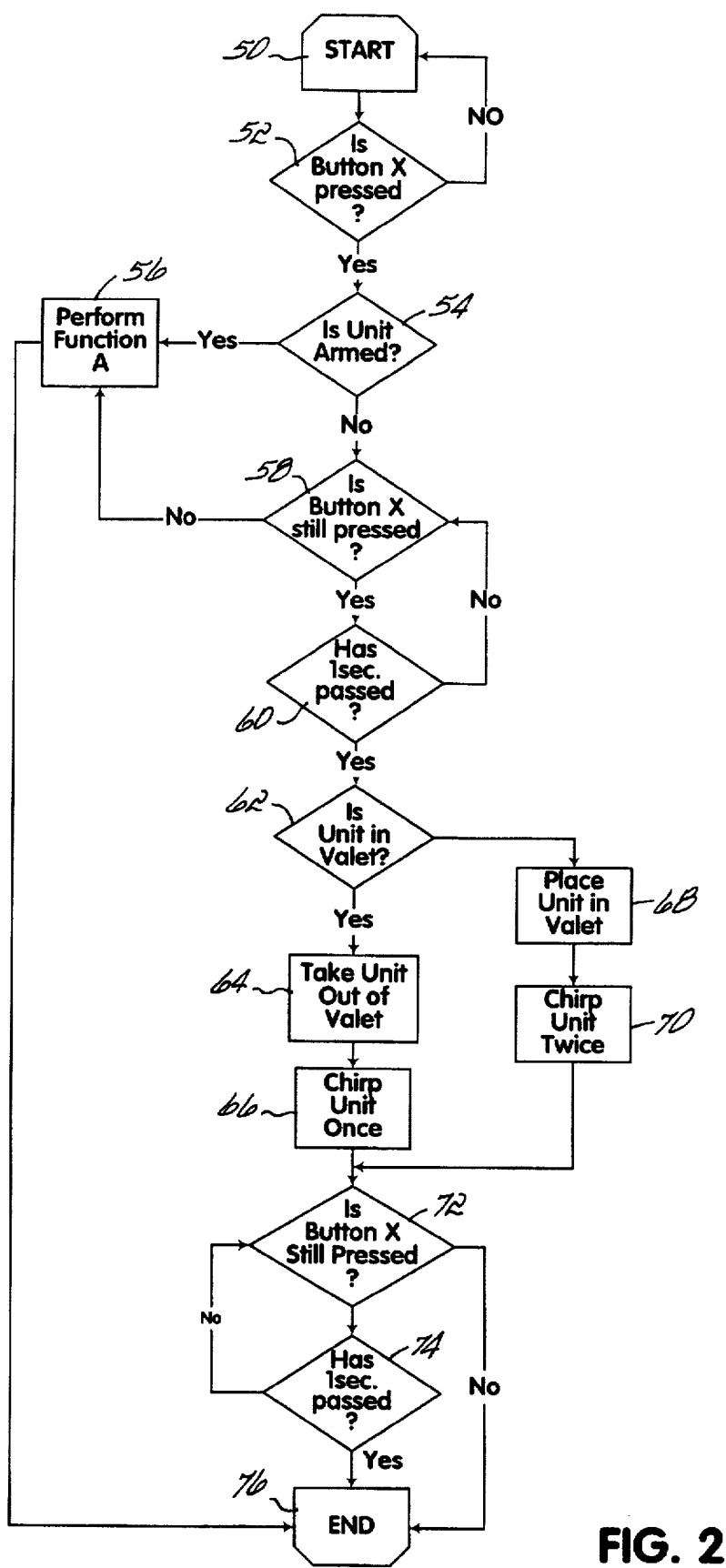
FIG. 2 is a flow chart of a software routine providing wireless remote control of enabling and disabling of a valet mode of the alarm.
Figure 3A:
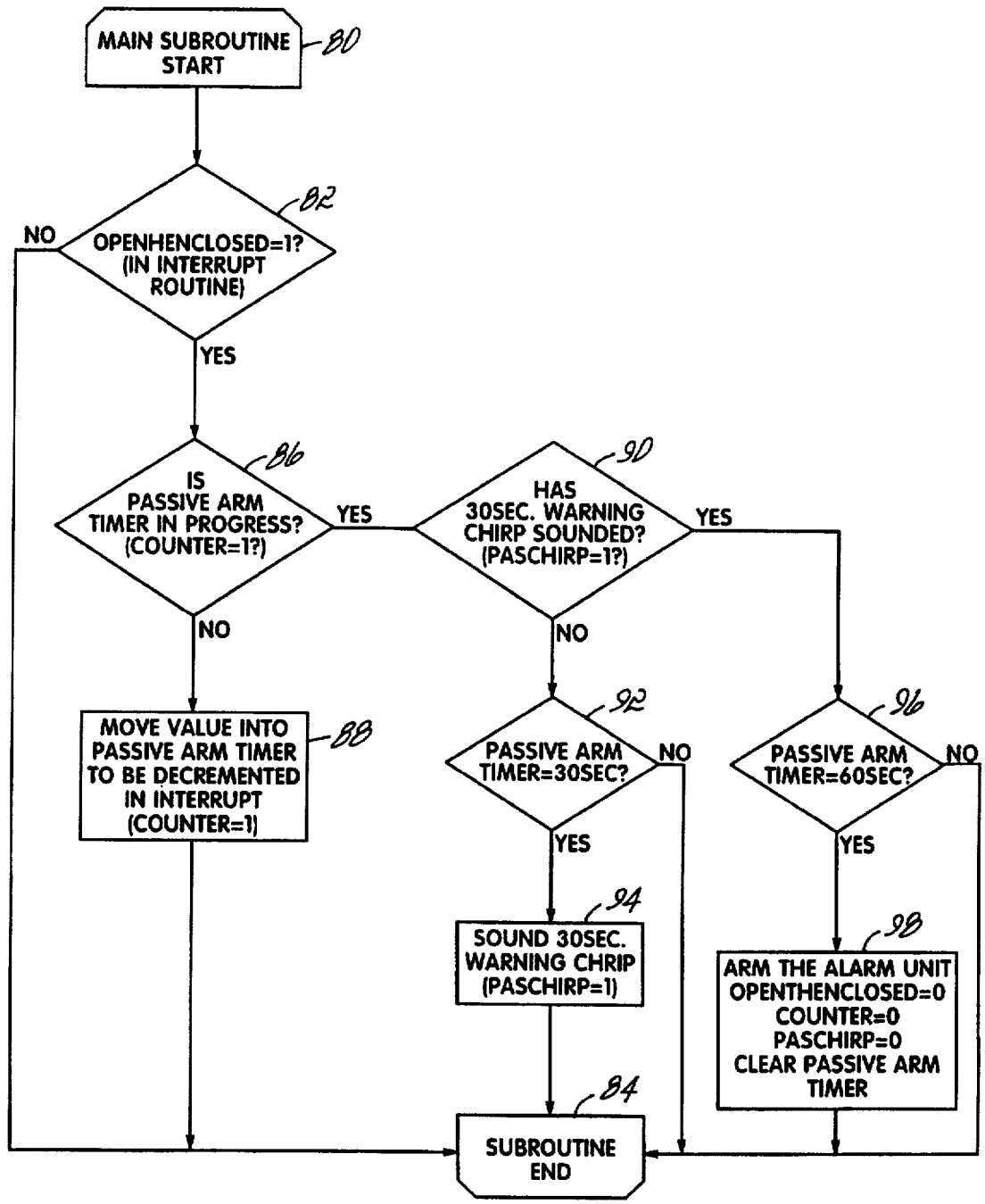
FIG. 3A is a flow chart of a software routine providing progressive passive arming of the alarm.
Figure 3B:
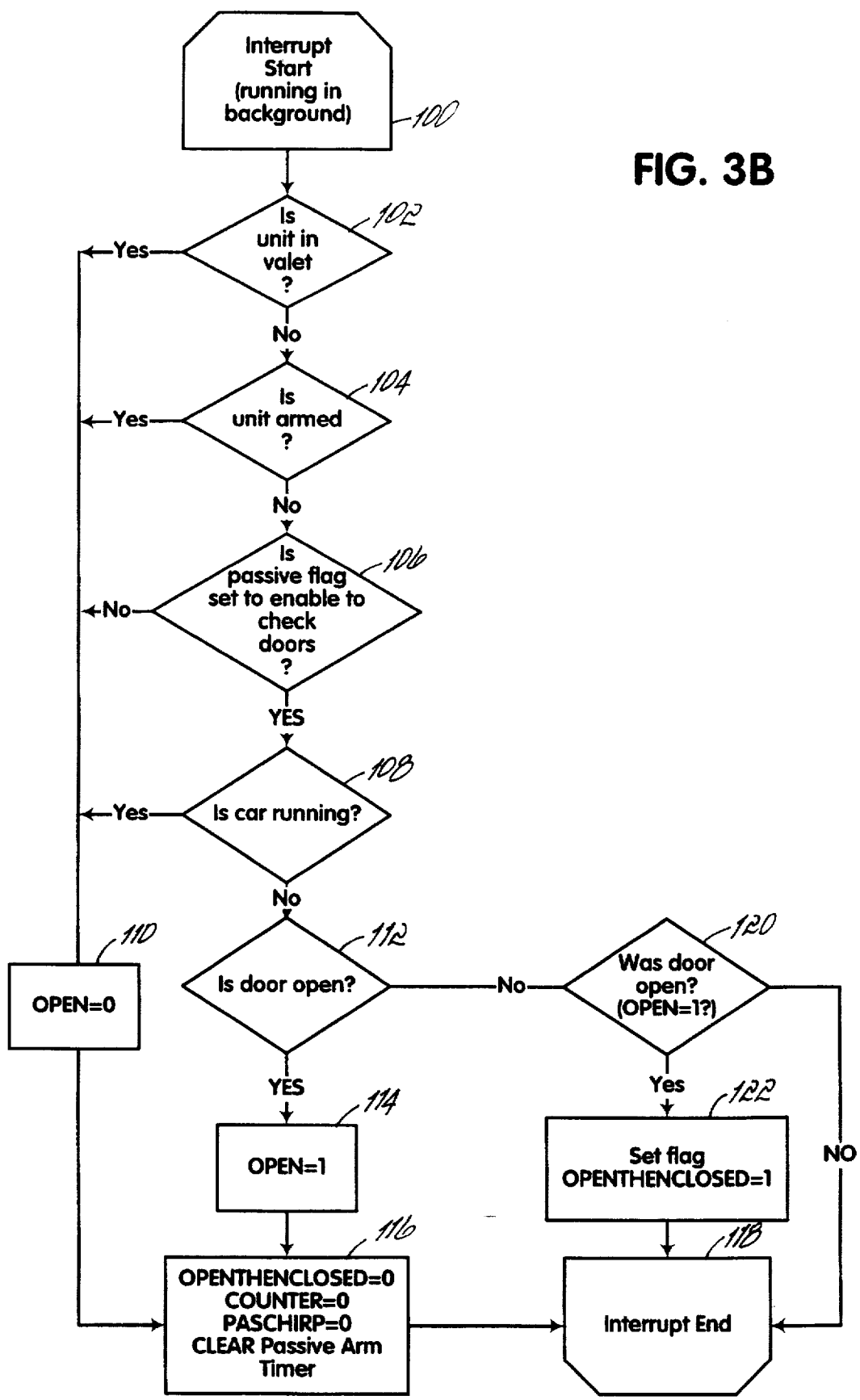
FIG. 3B is a flow chart of an interrupt routine for polling the condition of the vehicle doors and other status information in connection with progressive passive arming of the alarm.
Figure 3C:
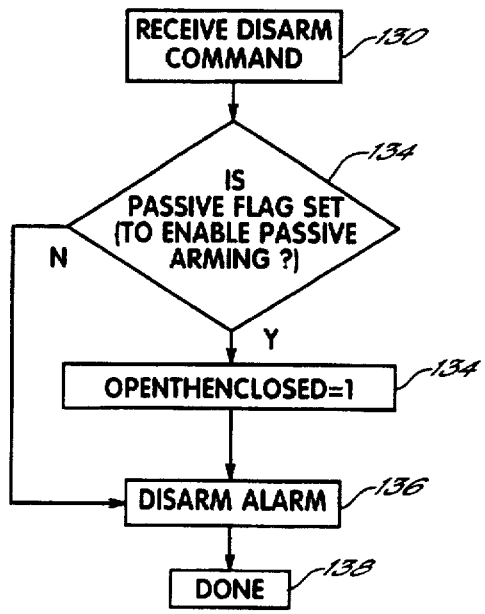
FIG. 3C is a flow chart of the software routine for disarming the alarm and immediately re-starting progressive passive arming of the alarm.
Figure 4:
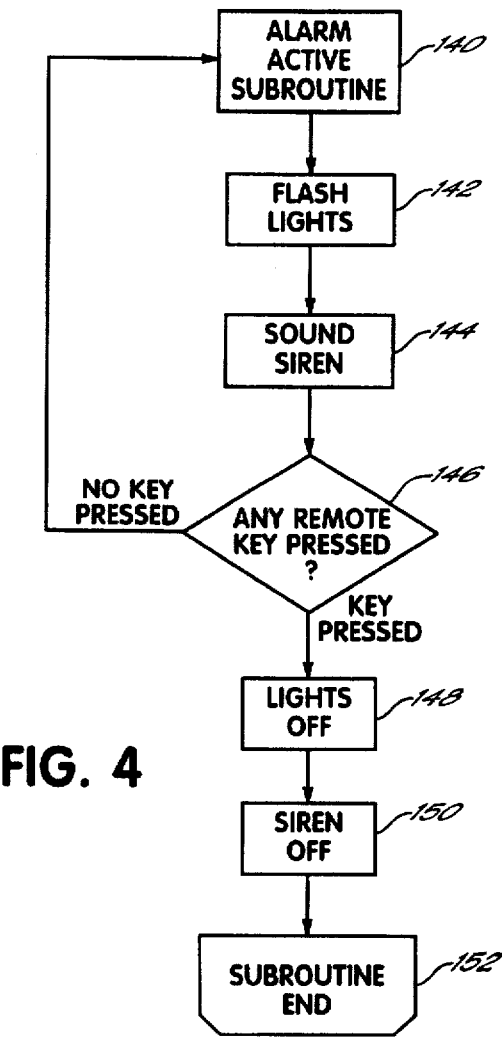
FIG. 4 is a flow chart of the software routine providing deactivation of the alarm through any button on the wireless remote control.

Referring now to FIGS. 2–4, the operation of the software in controller 10 can be diagrammatically illustrated in flow charts. The software includes a main routine and interrupt routines. The main routine (including each of the subroutines described below) repeats from start to finish repetitively in an endless loop. The interrupt routines interrupt the main routine at appropriate times, either according to a timed schedule or upon detection of an external condition. For example, a timed interrupt routine interrupts the main routine at regular intervals to update various internal time counters in controller 10 and to check the status of the sensors and switch 13–26 connected to controller 10. A second interrupt routine is initiated upon receipt of a command from wireless remote control transmitter 28, and evaluates the command.

The main routine and interrupt routines track the condition of controller and the alarm system by storing data in variables, flags, and counters, some of which are discussed below. These variables, flags and counters are used to store the state of the alarm system, to establish various delay times, and other functions needed to operate the alarm system as discussed below.

The portions of the interrupt and main routines relating to aspects of the present invention are shown in the Figs. attached hereto.

Particularly, referring to FIG. 2, a subroutine of the main routine of controller 10 is responsible for placing the alarm system in its valet mode through actuation of a button on the wireless remote control 28. The subroutine starts at step 50 (after other subroutines {not shown} of the main routine of controller 10) and proceeds to determine 52 whether a given button "X" on the remote control has been pressed. (Button "X" may be, for example, the button normally used to activate a panic alarm.) If this button has not been pressed, the subsequent steps in FIG. 2 are not performed; controller 10 moves directly to the end 76 of the subroutine, and thus continues on to other tasks in the main routine.

Controller 10 determines, at step 52, whether button "X" has been pressed by checking internal variables. Remote control transmissions received by receiver 30 (FIG. 1) are signalled to controller 10, which in response performs the above-noted interrupt routine to read the transmission and set variables and flags to indicate the meaning of the received transmission. Thereafter, controller 10 may reference these variables to determine whether and which remote buttons have been pressed.

If at step 52 controller 10 determines that button "X" has been pressed, controller 10 then proceeds to step 54 to determine whether the unit is armed. This is also indicated by an internal variable set by controller 10 when the operator arms or disarms the alarm system using the remote. If the unit is armed then controller 10 immediately proceeds to step 56 to perform the function, called "A", which is normally associated with button "X". For example, where button "X" is a panic alarm button (i.e., function "A" the panic alarm function of the alarm system), controller 10 will immediately initiate a panic alarm if button "X" is pressed while the alarm is armed.

If, however, the alarm system is not armed when button "X" is pressed, the alarm system will enter a loop 58, 60 to determine the length of time for which button "X" remains depressed. Initially, controller 10 resets an internal (interrupt-updated) timer to track the duration of time during loop 58, 60. Then, in the first step of the loop, controller 10 determines 58 whether button "X" is still depressed. If so, controller 10 proceeds to the second step, in which controller 10 determines 60 whether one second has passed during which button "X" has remained depressed, by checking the value of the above-noted internal timer.

As long as button "X" remains pressed, controller 10 will repeatedly cycle between steps 58 and 60, until one second of time elapses.

If, however, during this one second of time, button "X" is released, then controller 10 will detect this at step 58 and proceed to step 56 to perform the function "A" normally associated with button "X" (e.g., the panic alarm). Thus, even if the alarm system is not armed, the operator may initiate function "A" by simply pressing and releasing button "X" in less than a second.

On the other hand, if button "X" is not released for a full one second, then at the end of this second, controller 10 will determine, at step 60, that a second has elapsed, and will proceed to determine 62 whether the unit is in the valet mode, by checking a variable in controller 10 which identifies whether the alarm system is in valet mode.

If the alarm system is in valet mode, controller 10 takes the alarm system out of valet mode 64 by appropriately modifying the above-noted global variable. Then, controller 10 notifies the operator that this action has been taken by "chirping" 66 the siren; essentially, controller 10 briefly generates an enabling signal to siren 38 causing siren 38 to emit a short chirp. (This short chirp is created through the use of an interrupt-updated timer and loop, not shown for brevity.)

Returning to step 62, if the alarm system is not in valet mode, controller 10 puts the alarm system in valet mode 68 by appropriately modifying the above-noted variable. Then, controller 10 notifies the operator that this action has been taken by "chirping" 70 the siren twice in the manner discussed in the previous paragraph.

After thus setting the valet mode and notifying the operator, controller 10 initiates a one second timed loop 72, 74 (similar to loop 54, 58) to permit the operator to respond to the siren chirp and release button "X". To initiate this loop, controller 10 initializes an internal (interrupt-updated) timer prior to step 72. Then, at step 72 controller 10 determines whether button "X" is still pressed, and if so, at step 74 controller 10 determines if a second has passed. Controller 10 cycles repeatedly between steps 72 and 74 until the operator releases button X or a second passes, at which point controller 10 moves from step 72 or 74, respectively, to the end 76 of the subroutine, and on to other tasks of the main routine.

Through the functionality discussed above, the operator may place the alarm system in its valet mode using the wireless remote control, thus avoiding the need for a valet switch in the vehicle which would be a potential target for attack from thieves.

Referring to FIG. 3A, progressive passive arming in accordance with principles of the present invention is performed in a second subroutine of the software in controller 10. Upon entering 80 this subroutine, controller 10 determines 82 whether the alarm system should passively arm, by determining the condition of an internal flag OPENTHENCLOSED. OPENTHENCLOSED is a flag, set by a timed interrupt (FIG. 3B) which indicates that one or more door(s)

of the vehicle has been opened and subsequently closed while the alarm was not armed. Since this activity indicates that the driver and passengers have exited the vehicle, the alarm should be passively armed.

If OPENTHENCLOSED is not set, the subroutine immediately ends 84; however, if OPENTHENCLOSED is set, the subroutine proceeds to step 86 to begin progressive passive arming.

At step 86, controller 10 determines whether progressive passive arming has already begun, by determining whether an internal flag COUNTER is set. If passive arming has not begun (COUNTER=0), controller 10 proceeds to step 88, at which controller 10 initializes an internal (interrupt-updated) Arm Timer (i.e., counter) and also sets the flag COUNTER, thus initiating progressive passive arming. Thereafter, controller 10 proceeds to the end 84 of the subroutine and on to other tasks.

If progressive passive arming has already been initiated at step 86, during a previous pass through the main routine of controller 10, then at step 86, controller 10 proceeds to determine 90 whether a thirty-second warning chirp has been made (by checking a flag PASCHIRP). If not, controller 10 proceeds to step 92 and determine whether thirty seconds have elapsed on the Arm Timer. If not, controller 10 proceeds to the end 84 of the subroutine.

Controller 10 will follow the above-described path through the progressive passive arming subroutine for the first thirty seconds after controller 10 begins progressive passive arming. Throughout this period, the Arm Timer is updated in a timed interrupt. Ultimately, thirty seconds pass, and the Arm Timer is equal to thirty seconds. As a result, controller 10 proceeds from step 92 to step 94. In step 94, controller 10 sounds a warning chirp (in the general manner discussed above with respect to step 66 of FIG. 2), to warn the operator that the alarm system is preparing to passively arm. At the same time, controller 10 sets the flag PASCHIRP to indicate that the warning chirp has now sounded. Then, controller 10 proceeds to the end 84 of the subroutine.

After thus sounding the warning chirp, the next time controller 10 passes through the progressive passive arming subroutine it proceeds from step 90 to step 96, because the PASCHIRP flag is set. At step 96, controller 10 determines if a full minute (sixty seconds) has elapsed on the Arm Timer. If not, controller 10 proceeds to the end 84 of the subroutine.

Controller 10 follows the path described in the preceding paragraph through the progressive passive arming subroutine for the next thirty seconds after sounding the warning chirp, until the Arm Timer reaches sixty seconds. Once the Arm Timer reaches sixty seconds, controller 10 proceeds from step 96 to step 98. In step 98, controller 10 arms the alarm system (by appropriately modifying a variable), after which controller 10 clears the various flags discussed above, i.e., OPENTHENCLOSED, COUNTER and PASCHIRP, and proceeds to the end 84 of the subroutine.

It should be noted that, once these flags have been cleared in this manner, subsequent visits to the subroutine of FIG. 3A will proceed directly from step 82 to the end 84. Thus, once the alarm is armed (or OPENTHENCLOSED is cleared in some other way—see FIG. 3B below), no further warning chirps or other activities will occur in the subroutine of FIG. 3A.

Referring now to FIG. 3B, as noted above, a background interrupt is responsible for detecting the state of the sensors 13–26, and in particular the door open sensor 16, and for setting the flag OPENTHENCLOSED which activates progressive passive arming. The portion of the interrupt illustrated in FIG. 3B is responsible particularly for setting and clearing OPENTHENCLOSED.

After possibly performing other tasks and reaching the start 100 of this interrupt fragment, controller 10 performs a series of tests to determine if progressive passive arming should begin. First, controller 10 determines 102 if the alarm system is in its valet mode by checking the variable discussed above with reference to FIG. 2. If the system is in valet mode, then it should not passively arm; accordingly, in this case controller 10 proceeds to step 110, which will be discussed below.

Only if the system is not in valet mode, controller 10 proceeds to determine 104 whether the alarm system is armed, by checking the flag discussed above with reference to step 98, FIG. 3A. If the system is already armed, there is no need to perform passive arming, and so controller 10 proceeds to step 110.

Only if the system is not armed, controller 10 proceeds to determine 106 whether the alarm system is configured for passive arming, by checking a flag. If the system is not configured for passive arming, controller 10 proceeds to step 110.

Only if the system is configured for passive arming, controller 10 determines 108 if the vehicle is running, by checking flags indicating the condition of the current sensor 13. If the car is running, then the alarm system should not arm, in which case controller 10 proceeds to step 110.

If all of the above tests are passed successfully, then it is appropriate for controller 10 to passively arm the alarm system when the door is opened and then closed. To do this, controller 10 first determines 112 whether a door is open, by checking a flag indicative of the status of door open sensor 16. If a door is open, then controller 110 sets 114 a flag known as OPEN to indicate that a door was open. Next, controller 110 proceeds to step 116 to clear various flags and counters, for reasons that will be discussed below, and then moves to the end 118 of the interrupt fragment.

If, at step 112, a door is not open, then controller 10 determines 120 whether a door was previously open, i.e., whether the flag OPEN is set. If a door was open during a previous execution of the timed interrupt, then the flag OPEN will be set as a result of step 114. If a door was open, but no doors are open any longer, then controller 10 determines that a door has been opened and closed, indicating that the alarm system should begin progressive passive arming. Accordingly, controller 10 moves to step 122 and sets the flag OPENTHENCLOSED, which will cause progressive passive arming to commence as a result of the steps in the subroutine illustrated in FIG. 3A.

At this point, it should be noted that the purpose of the thirty-second warning chirp produced in the subroutine illustrated in FIG. 3A, is to warn the owner of forthcoming passive arming, so that the operator may prevent passive arming if so desired. There are several ways that the operator can prevent passive arming.

First, the operator may simply open a door of the vehicle to prevent passive arming. As can be seen in the flow chart of FIG. 3B, if a door is open, then the interrupt will proceed from step 112 to step 114 and through to step 116. At step 116, the flags OPENTHENCLOSED, COUNTER, and PASCHIRP, and the Arm Timer are cleared. This activity halts progressive passive arming, as was noted above with respect to step 98 of FIG. 3A. Accordingly, opening a door during progressive passive arming prevents passive arming.

Additionally, the operator may change any one of the conditions identified in steps 102–108 to prevent passive arming. For example, the operator may start the vehicle's engine, which will cause the interrupt to move from step 108 to step 110 and on to step 116, clearing the above-noted flags and halting progressive passive arming. As a further example, the operator may put the alarm system into valet mode (by the operations illustrated in FIG. 2), which will also cause the interrupt to move from step 102 to step 110 and one to step 116.

Now referring to FIG. 3C, an alarm system in accordance with principles of the present invention includes a distracted re-arming feature, under which the alarm, once disarmed, will re-arm itself if the operator becomes distracted.

Specifically, when the operator disarms the alarm, e.g., through a transmission from wireless remote transmitter 28 (FIG. 1), controller 10 enters a subroutine at step 130 for disarming the alarm system. In this subroutine, controller 10 first determines 132 whether the alarm system is configured for passive arming, by checking the internal variable noted above with respect to step 106. If the alarm system is configured for passive arming, then controller 10 proceeds to step 134 and sets the flag OPENTHENCLOSED discussed above in FIGS. 3A and 3B. Next, controller 10 disarms 136 the alarm and the subroutine is finished 138. If the alarm system is not configured for passive arming, step 134 is skipped.

As a result of the operations illustrated in FIG. 3C, the act of disarming the alarm system also immediately initiates progressive passive arming of the alarm system by setting the flag OPENTHENCLOSED, which results in the initiation of progressive passive arming as discussed above with reference to FIG. 3A.

It will be appreciated that, through this automatic re-arming, the alarm system cannot be unintentionally left unarmed, if for example the operator disarms the system and then becomes distracted and leaves the vehicle. At the same time, if the operator does not become distracted, but rather opens a door and/or starts the vehicle after disarming the alarm, either of these actions will halt re-arming for the reasons noted above with reference to FIG. 3B. Thus, the invention provides a distracted re-arming feature which prevents the vehicle from being unintentionally left unprotected.

Referring now to FIG. 4, in accordance with principles of the present invention, the wireless transmitter 28 may be used to deactivate the alarm when it has been triggered. Specifically, when the alarm is triggered, controller 10 moves to a subroutine including a loop 140, 142, 144, 146. In step 142 controller 10 flashes the parking lights of the vehicle, and in step 144 controller 10 sounds the siren. After these steps, controller 10 determines 146 whether any of the buttons on the wireless remote transmitter has been pressed (as indicated by flags set by an interrupt, as discussed above). If not, controller 10 returns to step 140 to repeat the above actions. If a button has been pressed, controller 10 deactivates the alarm by turning the parking lights off (step 148) and silencing the sire (step 150).

In step 146, controller 10 determines whether any of the buttons on the remote have been pressed. The buttons on the remote have various primary functions, as noted above with reference to FIG. 1. However, for the purposes of step 146, these primary functions are ignored and controller 10 simply determines whether any button has been pressed. If so, the alarm is terminated. Thus, if the owner unintentionally trips the alarm on the vehicle, the owner does not need to find a particular button or perform any other complex operations to halt the alarm; rather, the owner only needs to press any of the buttons on the remote to halt the alarm. This not only reduces stress on the owner, it shortens the time that the alarm sounds, thus avoiding embarrassment and reducing the desensitization of neighbors and passersby to the alarm.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. The vehicle alarm system of claim 17, further comprising a wireless remote control for generating a first remote control signal and wirelessly transmitting said remote control signal to said control circuit, wherein said control circuit has a valet mode in which said passive-arming function is disabled and said control circuit does not automatically change from said disarmed state to said armed state, and said control circuit is responsive to said remote control signal for entering or exiting said valet mode of said control circuit.

2. The vehicle alarm system of claim 1 wherein said alarm signaller is a siren.

3. The vehicle alarm system of claim 1 wherein said remote control wirelessly transmits said remote control signal to said control circuit by radio transmission.

4. The vehicle alarm system of claim 1 wherein said vehicle condition detector comprises one or more of a shock detector, a door position sensor, an ignition sensor, a brake pedal sensor, a hood position sensor, and a trunk position sensor.

5. The vehicle alarm system of claim 1 wherein said control circuit is further responsive to said remote control signal for generating said alarm signal, said control circuit generating said alarm signal when said remote control signal is received by said control circuit for less than a predetermined period of time, said control circuit entering said valet mode when said remote control signal is received by said control circuit for more than said predetermined period of time.

6. The vehicle alarm system of claim 1 wherein when said control circuit is in said valet mode, said control circuit responds to said remote control signal by exiting said valet mode, and when said control circuit is not in said valet mode, said control circuit responds to said remote control signal by entering said valet mode.

7. The vehicle alarm system of claim 1 wherein said wireless remote control includes a plurality of buttons, said wireless remote control generating said remote control signal upon depression of a first button and generating a second remote control signal upon depression of a second button.

8. The vehicle alarm system of claim 7 wherein said control circuit is connected to a door lock circuit of said vehicle, and said control circuit is responsive to said second remote control signal to activate said door lock circuit.

9. The vehicle alarm system of claim 7 wherein said control circuit is responsive to said second remote control signal to change said control circuit from said armed state to said disarmed state.

10. The vehicle alarm system of claim 9 wherein said control circuit, upon moving from said armed state to said disarmed state, briefly generates said alarm signal to cause said alarm signaller to notify an operator of disarming of the alarm system.

11. The vehicle alarm system of claim 9 wherein said control circuit is further responsive to said second remote control signal for changing said control circuit back from said disarmed state to said armed state after a predetermined period of time.

12. The vehicle alarm system of claim 7 wherein said control circuit is responsive to either said first or said second remote control signals to terminate generation of said alarm signal.

13. A vehicle alarm system, comprising a control circuit having an armed state in which said control circuit generates an alarm signal upon receipt of a vehicle condition signal indicative of a first vehicle condition, and a disarmed state in which said control circuit does not generate an alarm signal, an alarm signaller connected to said control circuit for receiving said alarm signal and signalling an alarm, and a vehicle condition detector connected to said control circuit for detecting vehicle conditions and generating said vehicle condition signal for said control circuit, wherein said control circuit is further responsive to said vehicle condition signal to provide a passive-arming function, in which said control circuit automatically changes from said disarmed state to said armed state upon continuous detection of a second vehicle condition, and after continuous detection of said second vehicle condition for a period of time, but before automatically changing from said disarmed state to said armed state, said control circuit briefly generates said alarm signal to cause said alarm signaller to notify an operator of forthcoming passive arming of said alarm system.

14. The vehicle alarm system of claim 13 wherein said control circuit briefly generates said alarm signal at least ten seconds prior to automatically changing from said disarmed state to said armed state.

15. The vehicle alarm system of claim 1 wherein said control circuit briefly generates said alarm signal after at least ten seconds of continuous detection of said second vehicle condition.

16. The vehicle alarm system of claim 15 wherein said second vehicle condition is a vehicle door remaining closed.

17. The vehicle alarm system of claim 13
further comprising a disarming device actuatable by an operator and connected to said control circuit to cause said control circuit to change from said armed state to said disarmed state, wherein said control circuit, after changing to said disarmed state in response to operator actuation of said disarming device, automatically changes back from said disarmed state to said armed state after a predetermined period of time.

18. The vehicle alarm system of claim 17 wherein said control circuit changes back from said disarmed state to said armed state after operator actuation of said disarming device only upon continuous detection of a third vehicle condition, indicative of distraction of the operator, during said predetermined period of time.

19. The vehicle alarm system of claim 18 wherein said third vehicle condition is one or more of a vehicle door remaining closed, and an engine of the vehicle not running.

* * * * *

UNITED STATES PATENT AND TRADEMARK OFFICE
CERTIFICATE OF CORRECTION

PATENT NO. : 5,677,664

DATED : October 14, 1997

INVENTOR(S) : James Sawinski

It is certified that error appears in the above-identified patent and that said Letters Patent is hereby corrected as shown below:

In the Abstract, line 5, after "used", insert --to--.

In Column 2, line 35, delete "takes", replace with --take--.

In Column 7, line 23, delete "determine", replace with --determines--.

In Column 9, line 57, delete "sire", replace with --siren--.

In Column 10, line 18, (claim 1, line 1) delete "claim 17", replace with --claim 13--.

Signed and Sealed this

Thirtieth Day of March, 1999

Attest:

Q. TODD DICKINSON

Attesting Officer

Acting Commissioner of Patents and Trademarks